(12) United States Patent
Lee et al.

(10) Patent No.: US 6,602,326 B2
(45) Date of Patent: Aug. 5, 2003

(54) METHOD FOR SEPARATION OF GAS CONSTITUENTS EMPLOYING HYDRATE PROMOTER

(75) Inventors: Huen Lee, Taejon (KR); Seong-Pil Kang, Taejon (KR)

(73) Assignee: Korea Advanced Institute of Science and Technology (KR)

( * ) Notice: Subject to any disclaimer, the term of this patent is extended or adjusted under 35 U.S.C. 154(b) by 29 days.

(21) Appl. No.: 09/878,056

(22) Filed: Jun. 7, 2001

(65) Prior Publication Data

US 2001/0052288 A1 Dec. 20, 2001

(30) Foreign Application Priority Data

Jun. 8, 2000 (KR) ......................................... 2000-31437

(51) Int. Cl.[7] ............................................... B01D 53/14
(52) U.S. Cl. .............................. 95/153; 95/236; 96/235; 423/220; 423/226; 585/15
(58) Field of Search .......................... 95/152, 153, 236; 96/235; 423/220, 226, 227, 228; 585/15

(56) References Cited

U.S. PATENT DOCUMENTS

| | | | |
|---|---|---|---|
| 5,364,611 A | * | 11/1994 | Iijima et al. |
| 5,434,330 A | | 7/1995 | Hnatow et al. |
| 5,536,893 A | * | 7/1996 | Gudmundsson |
| 5,562,891 A | * | 10/1996 | Spencer et al. |
| 5,700,311 A | | 12/1997 | Spencer |
| 6,028,234 A | * | 2/2000 | Heinemann et al. |
| 6,090,186 A | * | 7/2000 | Spencer |
| 6,106,595 A | * | 8/2000 | Spencer |
| 6,235,091 B1 | * | 5/2001 | Spencer |
| 6,352,576 B1 | * | 3/2002 | Spencer et al. |
| 6,372,023 B1 | * | 4/2002 | Kiyono et al. |

OTHER PUBLICATIONS

Kang, et al., *Recovery of $CO_2$ from Flue Gas Using Gas Hydrate: Thermodynamic Verification through Phase Equilibrium Measurements*; Environ. Sci. Technol. 34:4397–4400 (2000).

Kang, et al., *$S_H$ hydrate equilibria of (methane+water+2–methylbutane=magnesium chloride), (methane+water+2,2–dimethylbutane+magnesium chloride), and (methane+water+methylcyclohexane+magnesium chloride)*; J. Chem. Thermodynamics 31:763–772 (1999).

* cited by examiner

Primary Examiner—Duane S. Smith
(74) Attorney, Agent, or Firm—Knobbe Martens Olson & Bear LLP

(57) ABSTRACT

The present invention relates to a method for separation of gas constituents from a multicomponent gaseous mixture employing a hydrate promoter. The method for separation of gas constituents from a multicomponent gaseous mixture includes the steps of reacting an aqueous solution containing a hydrate promoter with a multicomponent gaseous mixture to form a gas hydrate condensed with the gas constituents of high gas hydrate forming power and dissociating a specific gas component from the gas hydrate. In accordance with the present invention, a specific gas component can be seperated from a multicomponent gaseous mixture under a pressure much lower than that of the prior art method, which makes possible its practical application in various industrial areas emitting exhaust gases.

20 Claims, 5 Drawing Sheets

METHOD FOR SEPARATION OF GAS CONSTITUENTS EMPLOYING HYDRATE PROMOTER

FIELD OF THE INVENTION

The present invention relates to a method for separation of gas constituents employing a hydrate promoter, more specifically, to a method for separation of gas constituents from a multicomponent gaseous mixture comprising the steps of reacting an aqueous solution containing a hydrate promoter with a multicomponent gaseous mixture to form a gas hydrate condensed with gas constituents of high gas hydrate forming power and dissociating a specific gas component from the gas hydrate.

BACKGROUND OF THE INVENTION

Carbon dioxide, methane and freon gases have been regarded as major causes of global warming, which drives researchers to develop methods for recovering the exhaust gases containing these gases generated from various industrial areas. The global warming gases, however, are emitted in the forms of multicomponent gaseous mixtures in most of the exhaust gases, rather than in a single gas component. Naturally, the needs have been increased to develop a method for separating and recovering a specific gas component from the exhaust gaseous mixtures.

The gas separation methods developed thus far, which are largely classified depending on the natures of separation system and desired gas component, include cryogenic fractionation, adsorption by solid adsorbents, gas absorption by liquid solvent, etc. These methods were partly successful in separating a gas component from a multicomponent gaseous mixture, but revealed a shortcoming of high energy consumption. The use of large quantity of energy is a major cause that lowers the economical efficiency in most industrial spots. For this reason, a variety of researches have been extensively made on developing methods for separating gas constituents from the multicomponent gaseous mixtures in an economical and efficient manner.

For example, U.S. Pat. No. 5,434,330 discloses a method for removing nitrogen gas from natural gas containing methane as a major component by dissociating a hydrate suspension formed by bringing an aqueous solution and multicomponent gaseous mixture into a contact to give an exhaust gas with decreased concentration of gas hydrate forming component. U.S. Pat. No. 5,700,311 teaches a method for selective removal of carbon dioxide from multicomponent gaseous mixtures employing a gas hydrate, which revealed defects caused by the nature of gas hydrate formation, i.e., the extremely high pressure for gas hydrate formation(e.g., 143 bar for nitrogen or 125 bar for oxygen), accompanies risky factors and requires an auxiliary pressure-resistant equipment. Naturally, it makes the separation and operation complicate and difficult, and shows very low cost-efficiency.

Under the circumstances, to overcome the problems of the prior art methods, there are strong reasons for developing and exploring a method for separating a specific gas component from a multicomponent gaseous mixture under the conditions of lower temperature and pressure in a safe and economical manner.

SUMMARY OF THE INVENTION

The present inventors have made an effort to develop a method for separating a specific gas component from a multicomponent gaseous mixture under mild conditions of low temperature and pressure, and discovered that: acetone, propylene oxide, 1,4-dioxane, or tetrahydrofuran(THF) employed to form a gas hydrate, bring promotion effect which increases gas hydrate equilibrium temperature with lowering pressure, and they play a role as a hydrate promoter to make possible the successful separation of a specific gas component from a multicomponent gaseous mixture under a low pressure for gas hydrate formation.

A primary object of the present invention is, therefore, to provide a method for separation of gas constituents from multicomponent gaseous mixtures by employing a hydrate promoter.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

Figure 1:
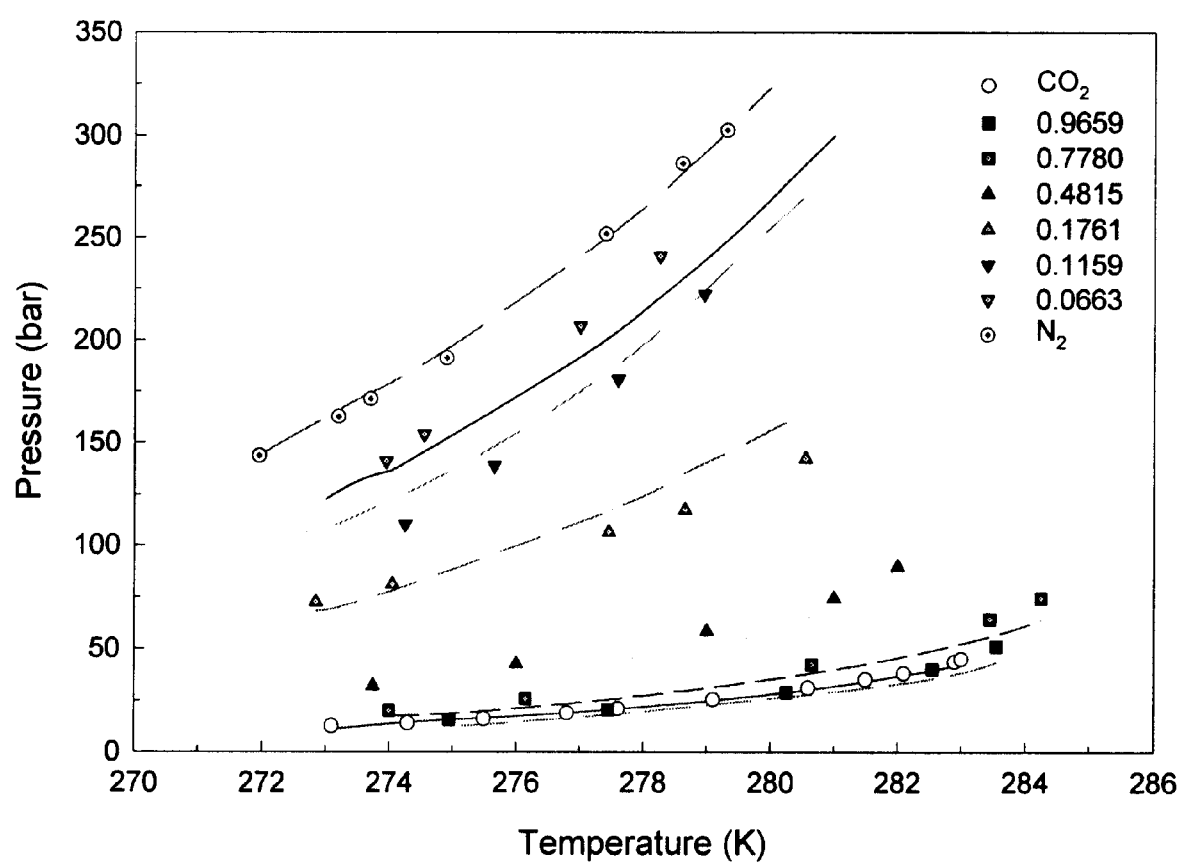
FIG. 1 is a graph showing three-phase equilibrium dissociation condition for a gas hydrate formed by reacting a gas mixture of carbon dioxide and nitrogen with water.

A method for separation of gas constituents employing a hydrate promoter comprises the steps of reacting an aqueous solution of a hydrate promoter with a multicomponent gaseous mixture to form a gas hydrate condensed with gas constituents of high gas hydrate forming power and dissociating a specific gas component from the gas hydrate.

The method for separation of gas constituents employing a hydrate promoter of the invention is illustrated in more detail by the following steps.

Step 1: Formation of gas hydrate

A gas mixture reacts with an aqueous solution containing a hydrate promoter to form a gas hydrate condensed with gas constituents of high gas hydrate forming power. In general, the structures of hydrates formed from water molecules are largely classified as Structure-I and Structure-II, which are constituted with 46 and 146 water molecules, respectively. Each structure has several cavities with different sizes, which are used to make complexes with gas molecules to form gas hydrates. The extent of hydrates formation that gas molecules make complexes with water molecules (hereinafter referred to as 'hydrate forming power') is determined by the various factors such as solubility of gas, hydrogen bonding ability, size of gas molecules, etc.

In the gas hydrates formation between gas molecules with water molecules mentioned above, the addition of hydrate promoter selected from the group consisting of acetone, propylene oxide, 1,4-dioxane, tetrahydrofuran or mixture thereofs forms hydrates of promoter/water molecule and water molecule only. The promoter/water molecule hydrates thus formed are more stable than the hydrates formed by solely water molecules in terms of their structures. Moreover, the compounds used as the promoters are relatively non-polar compared to water molecules, which facilitates the formation of gas hydrates of water molecules and non-polar gases such as carbon dioxide and methane at low pressures. The hydrate promoters exist in aqueous solutions preferably in the concentration range of 0.5 to 6.0 mol %, which makes possible the formation of gas hydrates at the temperature of 272 to 303 K under a relatively low pressure of 1 to 60 bar. When the concentration of the hydrate promoter is less than 0.5 mol %, the amount of the promoter is too small to give enough amounts of the hydrates formed from the promoter and water molecules, while more than 6.0 mol % of promoter decreases the cavity number of the hydrates formed from water molecules to cause inhibition effects occurred by lowering equilibrium temperature and elevating the equilibrium pressure.

Step 2: Dissociation of gas hydrate

The gas hydrate formed above is dissociated to give a specific gas component. Since the gas hydrate possessing unstable structure that can exist only under limited conditions of controlled temperature and pressure(three-phase equilibrium conditions), the gas hydrates are spontaneously dissociated without additional energy by creating non-equilibrium condition. That is, a specific gas component can be separated from the gas hydrates by lowering the pressure or elevating the temperature. The gas hydrate is formed at around the room temperature and higher pressure than atmosphere pressure. Accordingly, the dissociation of gas hydrates can be made economically, since the auxiliary decompressing equipment is not required.

Although the separation of gas constituents of the invention can be accomplished in a single time as long as the hydrate formation characteristics of each gas constituents in the multicomponent gaseous mixture is largely different from each other, it is obvious to the skilled in the art that the successful separation can be made by the repetition of the separation steps even though the hydrate formation characteristics of each gas constituents in the gas mixture is similar.

The present invention is further illustrated in the following examples, which should not be taken to limit the scope of the invention. In particular, the method for separation of gas constituents of the invention can be applied to all of the multicomponent gas mixtures containing gas components which can form gas hydrates.

EXAMPLE 1

Plotting of Phase Equilibrium Curves for a Gas Mixture of Carbon Dioxide and Nitrogen The range of temperatures and pressures within which the gas hydrates are formed in the course of gas separation for carbon dioxide and nitrogen, and phase equilibrium data were determined by using a high pressure phase equilibrium apparatus(see: J. Chem. Thermodyn., 31:763–772(1999)): First, any impurities in the equilibrium cell were removed by using a vacuum pump and an aqueous THF solution was injected into the equilibrium cell, then temperature was adjusted at the desired one. Next, the di-component gas mixture containing carbon dioxide and nitrogen was injected to control the pressure to the desired level followed by a decrease of the temperature to form gas hydrates. At this time, the complete mixing was assured by stirring continuously a magnetic spin bar in the equilibrium cell. Finally, the mixture was stirred for 1 to 4 hours while watching the formation of gas hydrates with naked eyes through the sapphire windows installed on the front and back sides of the equilibrium cell. When the reaction was performed to some extent, temperature was slowly elevated to a predicted value, and temperature and pressure at the point of keeping a constant amount of the gas hydrate for about 8 hours were taken as the equilibrium points. The compositions of gas phase and gas hydrate phase were measured by employing gas chromatograph on-line connected to the equilibrium cell, respectively.

FIG. 1 is a graph showing three-phase(a gas hydrate phase, a liquid phase, and a gas phase) equilibrium dissociation condition for a gas hydrate formed by reacting a gas mixture of carbon dioxide and nitrogen with water, as measured by the method described above. In FIG. 1, -(○)-, -(■)-, -(□)-, -(▲)-, -(△)-, -(▼)-, -(▽)- and -(◎)-represent equilibrium dissociation conditions, respectively, of a gas mixture of carbon dioxide and nitrogen with the mole ratios of carbon dioxide of 1.0000, 0.9659, 0.7780, 0.4815, 0.1761, 0.1159, 0.0663 and 0.0000, respectively; and, the dotted lines are experimental values and the solid lines are theoretical values calculated by a gas hydrate equilibrium model based on thermodynamics. As shown in FIG. 1, gas mixtures exist at the pressure within the range of equilibrium dissociation pressures of pure component of carbon dioxide and nitrogen each depending on their compositions and they are aggregated near the dissociation pressure of pure carbon dioxide rather than constantly proportionate to the compositions. Exhaust gases, in general, contain 10 to 20 mol % of carbon dioxide and especially, exhaust gases from power plants contain 17 mol % of carbon dioxide. According to FIG. 1, the gas hydrate equilibrium pressure in a gas mixture of nitrogen and 17 mol % of carbon dioxide is above 70 bar at 273 K.

Figure 2:
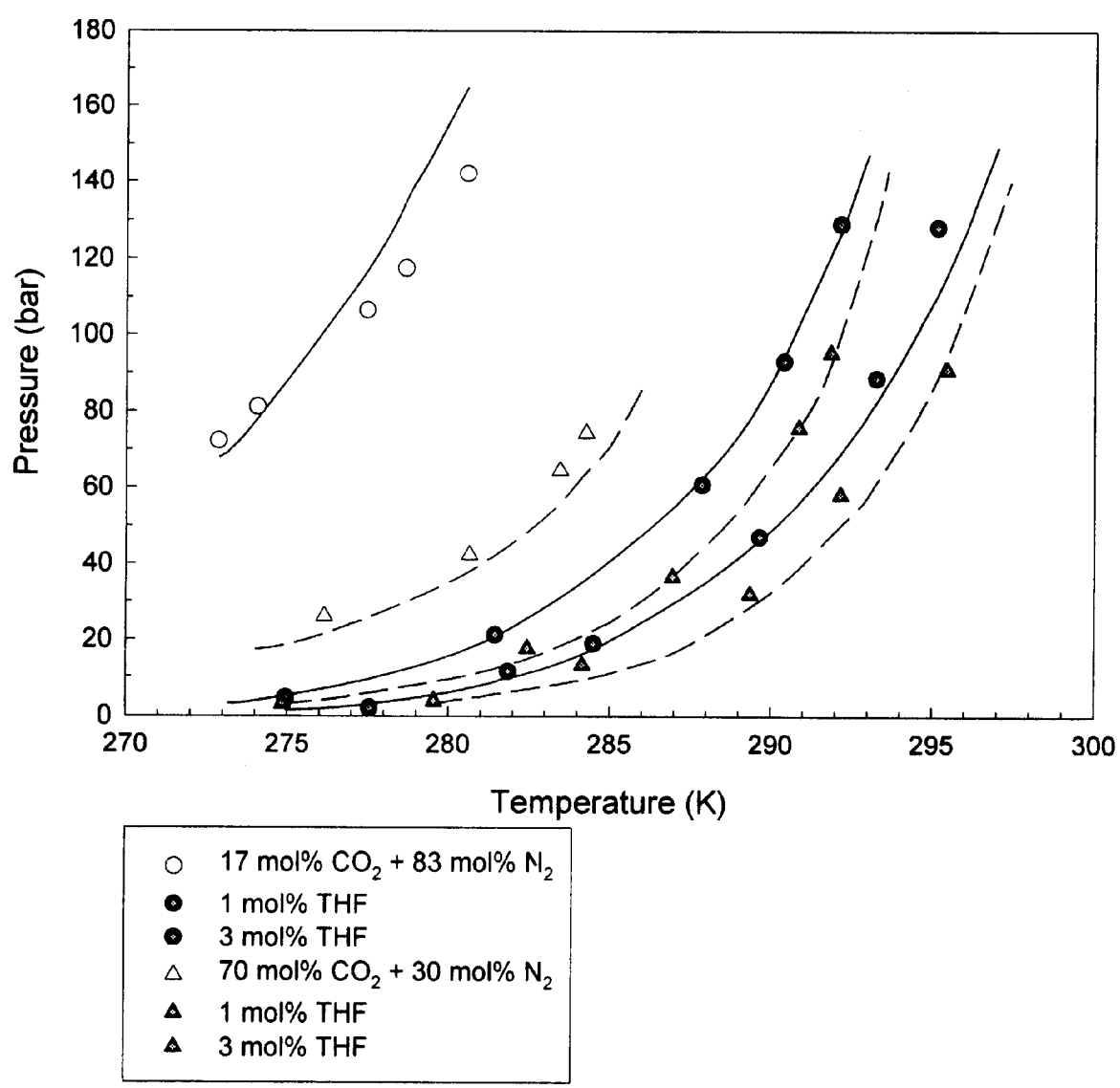
FIG. 2 is a graph showing three-phase equilibrium dissociation conditions for gas hydrates formed by reacting a gas mixture of carbon dioxide and nitrogen with 1 and 3 mol % of tetrahydrofuran(THF), respectively.

FIG. 2 is a graph showing three-phase(a gas hydrate phase, a liquid phase, and a gas phase) equilibrium dissociation conditions for gas hydrates formed by reacting a gas mixture of carbon dioxide and nitrogen with 1 and 3 mol % of tetrahydrofuran(THF). According to FIG. 2, the dissociation pressures are distinctively dropped by the addition of THF as a hydrate promoter to an aqueous solution compared to the one without THF(i.e., FIG. 1), more definitely, the dissociation pressure of a gas mixture containing 17 mol % carbon dioxide is dropped from 83.5 bar to 4.75 bar at 275 K by the addition of 1 mol % THF. This sharp decrease in dissociation pressure implies the expansion in stable area of the gas hydrates, which shows that the separating method employing a hydrate promoter can be performed in economical conditions compared to prior art methods.

Figure 3:
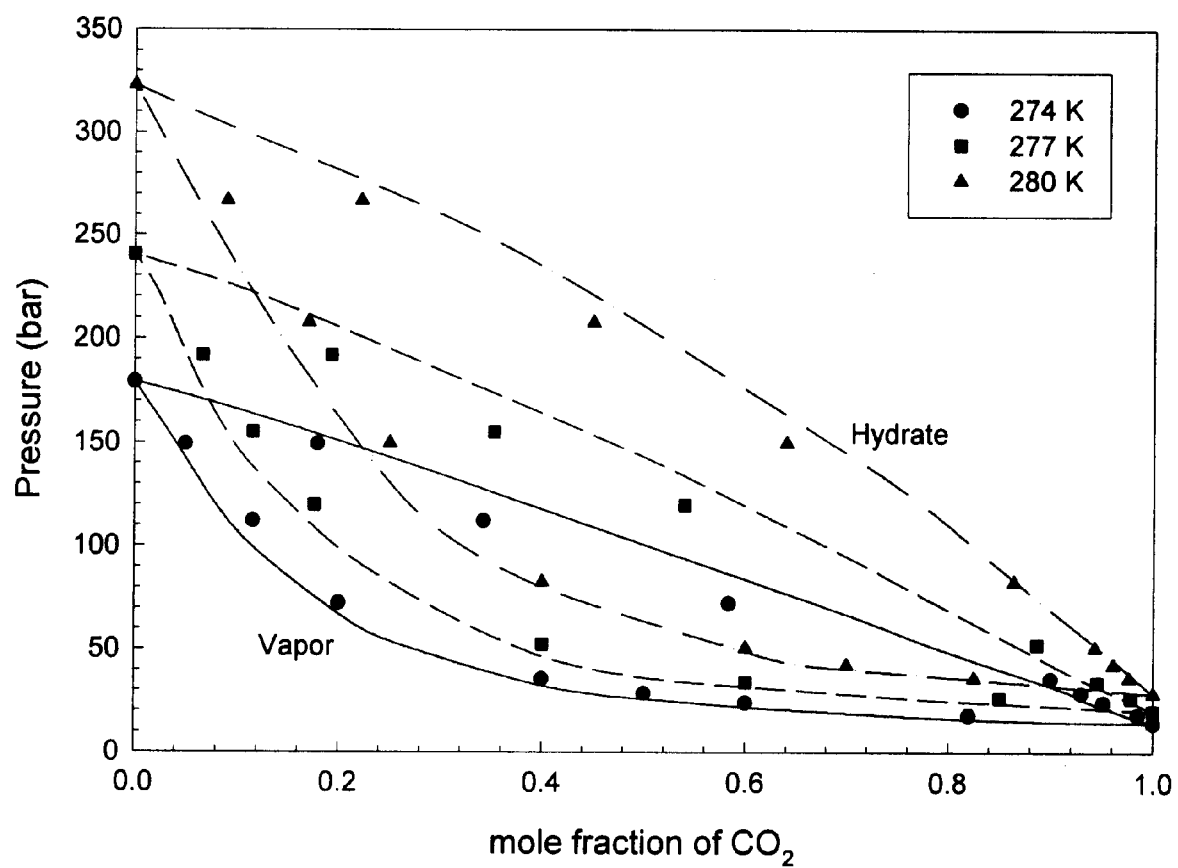
FIG. 3 is a graph showing compositions of gas hydrates with pressure change of a gas mixture of carbon dioxide and nitrogen at constant temperatures of 274, 277 and 280 K, respectively.

FIG. 3 is a graph showing compositions of gas hydrate phases with the change in pressure of a mixture of carbon dioxide and nitrogen at constant temperatures of 274, 277 and 280 K, respectively, based on the results of FIG. 1. In FIG. 3, the mole fraction of carbon dioxide indicates the mole ratios of carbon dioxide to a gas mixture of carbon dioxide and nitrogen excluding water. According to FIG. 3, the gas hydrate phase that is obtained by the reaction of a gas mixture containing 17 mol % carbon dioxide at 274 K is composed of 58 mol % carbon dioxide and 42 mol % nitrogen. The gas hydrate obtained above is dissociated to give the gas mixture of same compositions, and another gas hydrate reaction gives 95 mol % of carbon dioxide. However, according to FIG. 3, since exhaust gas requires maintaining an extremely high pressure to form a gas hydrate, a pressurizing process accompanying a high energy consumption is necessary.

Figure 4:
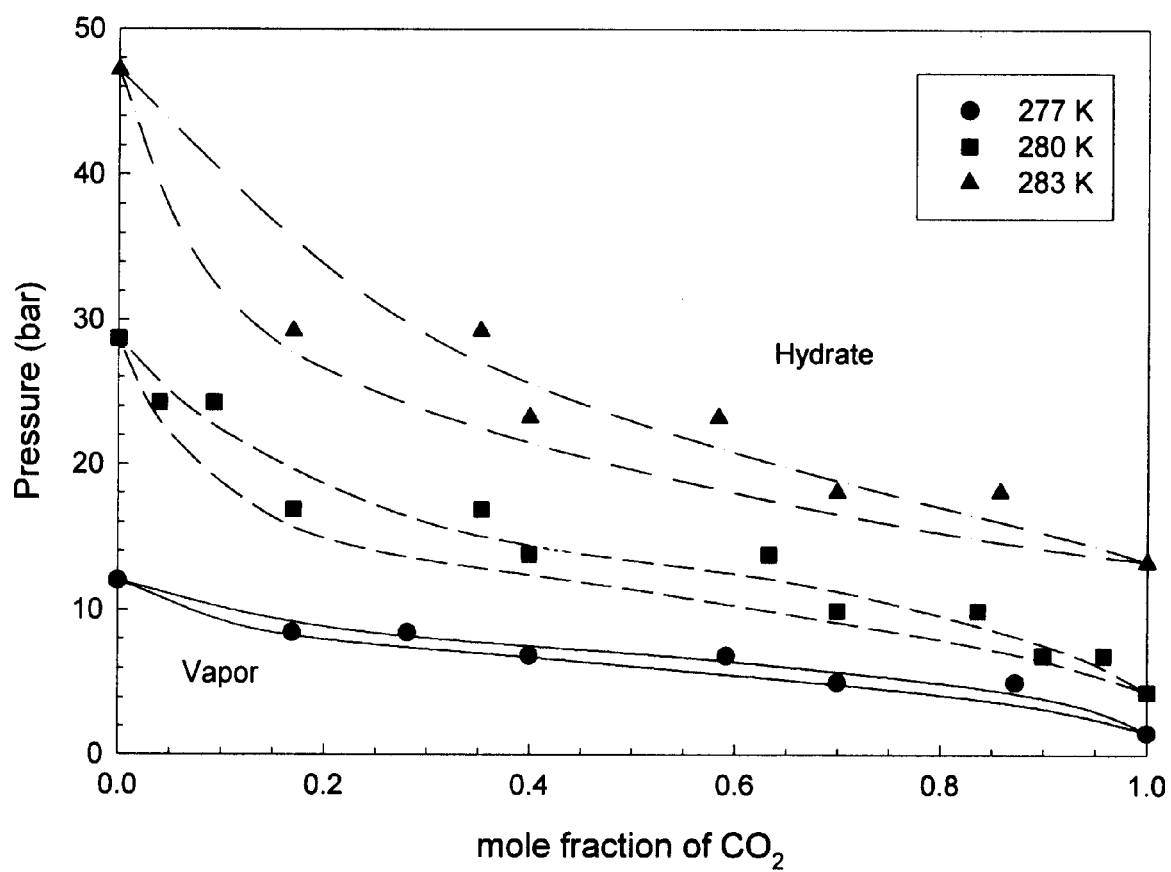
FIG. 4 is a graph showing compositions of gas hydrates with pressure change of a gas mixture of carbon dioxide and nitrogen at constant temperatures of 274, 277 and 280 K, respectively, after adding 1 mol % THF as a hydrate promoter.

FIG. 4 is a graph showing compositions of gas hydrate phases with the change in pressure of a mixture of carbon dioxide and nitrogen at constant temperatures of 274, 277 and 280 K, respectively, after adding 1 mol % THF as a hydrate promoter. In FIG. 4, the mole fraction of carbon dioxide indicates the mole ratios of carbon dioxide to a gas mixture of carbon dioxide and nitrogen excluding water and THF. Since THF itself forms hydrates with water molecules, the amount of THF should be kept as small as possible to prevent the number of cavities available to carbon dioxide or nitrogen from decreasing by the addition of large amount of THF. According to the literature, it is known that at least more than 1 mol % of THF forms gas hydrates with water(see: Int. Gas. Res. Conf., London, p1012, 1983). As shown in FIG. 4, the equilibrium dissociation pressure in a gas mixture of 17 mol % carbon dioxide and 83 mol % nitrogen is dropped to 16.5 bar at 280 K by the addition of 1 mol % THF, which is much lower than the one without the addition. At this time, the gas hydrate phase is composed of 34.71 mol % carbon dioxide and 69.39 mol % nitrogen. The gas hydrate obtained above is dissociated to give the gas mixture of same composition and the highly pure carbon dioxide with the same as FIG. 3 is obtained by repeating the process by which the gas hydrate is formed.

EXAMPLE 2

Separation of a Gas Component from a Gas Mixture of Carbon Dioxide and Nitrogen

Figure 5:
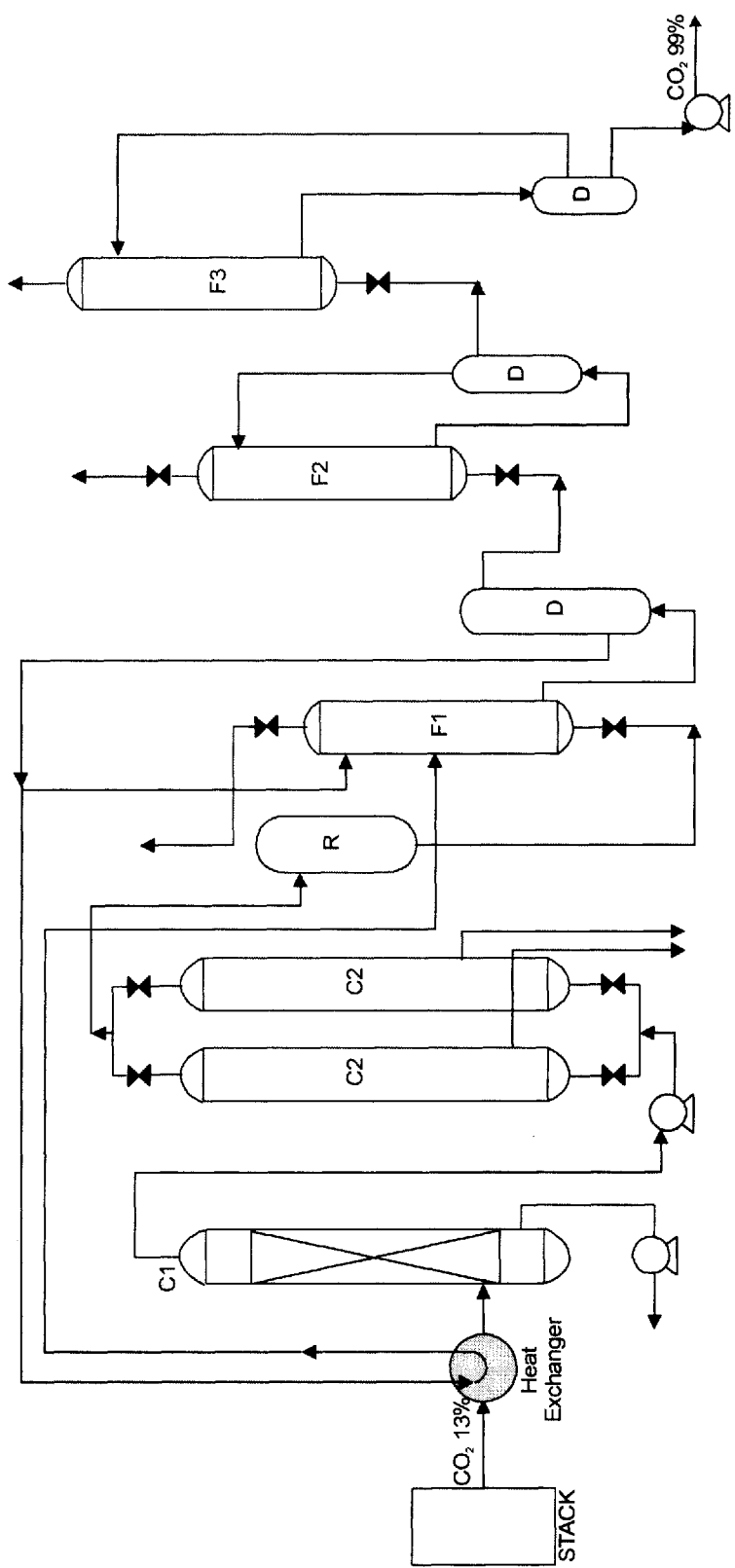
FIG. 5 is a schematic diagram of a separating equipment of carbon dioxide from multicomponent gaseous mixture employed in the present invention.

Carbon dioxide was separated from combustion exhaust gases by the above method for separation employing a hydrate promoter. Combustion exhaust gases containing various gases such as carbon dioxide, nitrogen, moisture, nitrogen oxide and sulfur were pre-treated by using a sprinkler tower and a dust collector to remove the gases except carbon dioxide and nitrogen, finally to give a di-component gas mixture of carbon dioxide and nitrogen. FIG. 5 is a schematic diagram of equipment for separating carbon dioxide from a multicomponent gas mixture.

Multicomponent combustion exhaust gas was first cooled by using a heat exchanger to 278 K at which the separation was performed, and then passed through a dehumidifying tower(C1) and a dust collector(C2) to remove moisture, dust and hydrogen sulfide contained in the exhaust gas before moving to a storage(R). A gas chromatography for the composition of pre-treated gas mixture revealed that the ratio of carbon dioxide/nitrogen was 17/83(mol/mol). Next, the pre-treated gas mixture was transferred to a gas hydrate reactor(F1) and reacted with an aqueous solution of 1 mol % THF at 278 K and 15 bar to form a gas hydrate. The gas hydrate thus formed was transferred to a dissociator(D) and then dissociated by decompressing to atmosphere pressure. The composition of the dissociated gas was found to be 45/55(mol/mol) of carbon dioxide/nitrogen. After repeating twice for the gas mixture obtained by the separation described above, carbon dioxide with a purity of more than 99.8 mol % was finally separated.

As clearly described and demonstrated above, the present invention provides a method for separation of gas constituents from a multicomponent gaseous mixtures by reacting an aqueous solution containing a hydrate promoter with a multicomponent gaseous mixture to form a gas hydrate condensed with components of high gas hydrate forming power and dissociating a specific gas component from the gas hydrate. In accordance with the present invention, a specific gas component can be separated from a multicomponent gaseous mixture under a pressure much lower than that of the prior art method, which makes possible its practical application in various industrial areas emitting exhaust gases.

What is claimed is:

1. A method of treating a gaseous mixture, comprising:

providing a gaseous mixture comprising at least two components with a first composition;

providing an aqueous solution comprising a chemical compound adapted to enhance hydration of at least one of the components of the gaseous mixture; and contacting the gaseous mixture with the aqueous solution at a pressure lower than the equilibrium pressure of the dissolution of the at least one of the components in water at a given temperature, thereby hydrating gas molecules of the components in the aqueous solution.

2. The method of claim 1, wherein the hydration comprises forming complexes of the gas molecules with water molecules.

3. The method of claim 1, wherein the chemical compound lowers an equilibrium pressure between the components and hydrate forms thereof at a given temperature.

4. The method of claim 1, wherein the chemical compound is selected from the group consisting of acetone; propyleneoxide; 1,4-dioxane; and tetrahydrofuran.

5. The method of claim 1, wherein a concentration of the chemical compound in the aqueous solution ranges from about 0.5 mol % to about 6.0 mol %.

6. The method of claim 1, wherein a concentration of the chemical compound in the aqueous solution ranges from about 1 mol % to about 3 mol %.

7. The method of claim 1, wherein the contacting of the gas with the aqueous solution is performed at a temperature ranged from about 272 K to about 303 K.

8. The method of claim 1, wherein the contacting of the gas with the aqueous solution is performed at a temperature ranged from about 275 K to about 295 K.

9. The method of claim 1, wherein the contacting of the gas with the aqueous solution is performed at a pressure ranged from about 1 bar to about 60 bar.

10. The method of claim 1, wherein the aqueous solution after the contacting with the gaseous mixture comprises the at least two components dissolved therein with a composition differing from the first composition.

11. The method of claim 1, further comprising dehydrating the hydrated gas molecules of the components, thereby releasing another gaseous mixture comprising the at least two components with a second composition.

12. The method of claim 11, wherein the dehydrating comprises at least one of lowering pressure or elevating temperature of the aqueous solution retaining the components.

13. The method of claim 11, further comprising collecting the released gaseous mixture with the second composition differing from the first composition.

14. The method of claim 13, further comprising repeating the acts of contacting, dehydrating and collecting at least once with regard to the collected gaseous mixture so as to separate a gaseous component from the gaseous mixture.

15. The method of claim 14, wherein the gaseous mixture comprises combustion exhaust.

16. The method of claim 1, wherein the gaseous mixture comprises carbon dioxide and nitrogen.

17. An apparatus for use in separating a gas component from a multi-component gaseous mixture, the apparatus comprising:

a hydration reactor adapted to contain an aqueous solution comprising a chemical compound enhancing hydration of gas molecules, the hydration reactor comprising an inlet adapted to receive a first multi-component gaseous mixture, wherein the aqueous solution is adapted to contact with the first gaseous mixture, whereby gas molecules hydrate and dissolve into the aqueous solution;

a dehydration reactor comprising an inlet adapted to receive the aqueous solution comprising hydrated forms of the gas molecules from the hydration reactor, wherein the dehydration reactor is configured to dehydrate the hydrated gas molecules, thereby releasing a second multi-component gaseous mixture; and a collector adapted to collect the second gaseous mixture.

18. The apparatus of claim 17, wherein the dehydration reactor comprises a heater to heating the aqueous solution received from the hydration reactor.

19. The apparatus of claim 17, wherein the dehydration reactor comprises a decompressor to lower pressure inside the reactor.

20. The apparatus of claim 17, wherein the chemical compound is selected from the group consisting of acetone; propyleneoxide; 1,4-dioxane; and tetrahydrofuran.

* * * * *